United States Patent [19]
Hore

[11] Patent Number: 5,552,703
[45] Date of Patent: Sep. 3, 1996

[54] INCLINATION SENSOR USING SENSING COILS WOUND ON LINEAR VESSEL PARTIALLY FILLED WITH FLUID

[75] Inventor: Donald L. Hore, Bristol, England

[73] Assignee: Radiodetection Limited, Bristol, England

[21] Appl. No.: 121,883

[22] Filed: Sep. 17, 1993

[30] Foreign Application Priority Data

Sep. 28, 1992 [GB] United Kingdom ............... 9220422

[51] Int. Cl.$^6$ .............................. G01B 7/14; G01P 15/00; G01C 9/06
[52] U.S. Cl. .................. 324/207.22; 324/226; 33/366
[58] Field of Search .......................... 324/207.22, 226; 73/516 LM; 33/366

[56] References Cited

U.S. PATENT DOCUMENTS

| | | | |
|---|---|---|---|
| 3,184,861 | 5/1965 | Conrad | 33/366 |
| 3,839,904 | 10/1974 | Stripling et al. | |
| 3,984,918 | 10/1976 | Chaney | 73/516 LM |
| 4,779,353 | 10/1988 | Lopes et al. | |

FOREIGN PATENT DOCUMENTS

3931423A1  1/1991  Germany.

OTHER PUBLICATIONS

Messtechnik, vol. 82, No. 1, Jan. 1974, Munchen De pp. 13–18, K. Eibl et al. 'Das Differenzprinzip zur Linearisierung eines Induktiven Längenmessumformers mit Frequenzausgang', pp. 13–14 (no translation).

*Primary Examiner*—Walter E. Snow
*Attorney, Agent, or Firm*—Larson and Taylor

[57] ABSTRACT

An elongate vessel, preferably cylindrical, is partially filled with a conductive and/or ferromagnetic fluid. At least two coils are wound on the vessel in longitudinally different regions so that tilting the vessel varies the amount of the fluid inside the coils differently. This affects their inductances. The variation in inductances is monitored, directly or indirectly, e.g. by applying an AC signal to the coils and monitoring the voltage drops across them. This provides an electrical output related to the inclination of the sensor's axis. It is unaffected by rotation about the axis. Thus the sensor can be used to monitor the orientation of the axis of a drilling tool, e.g. a mole, which rotates about its axis.

3 Claims, 2 Drawing Sheets

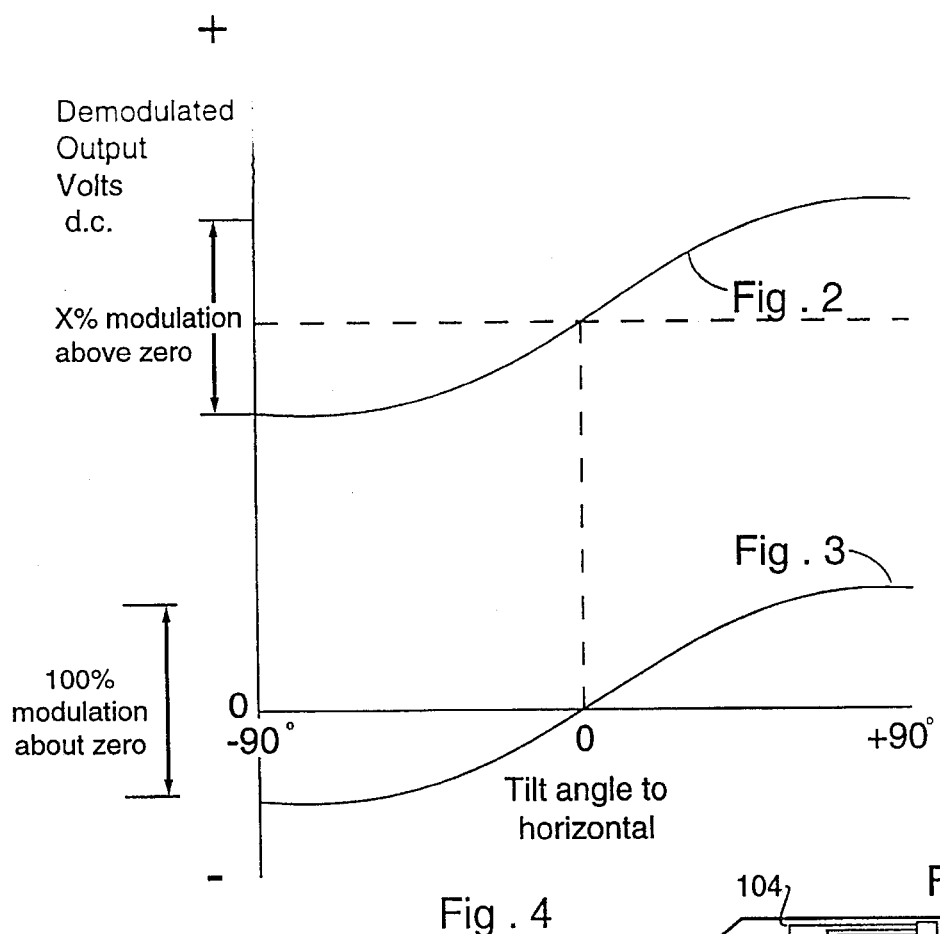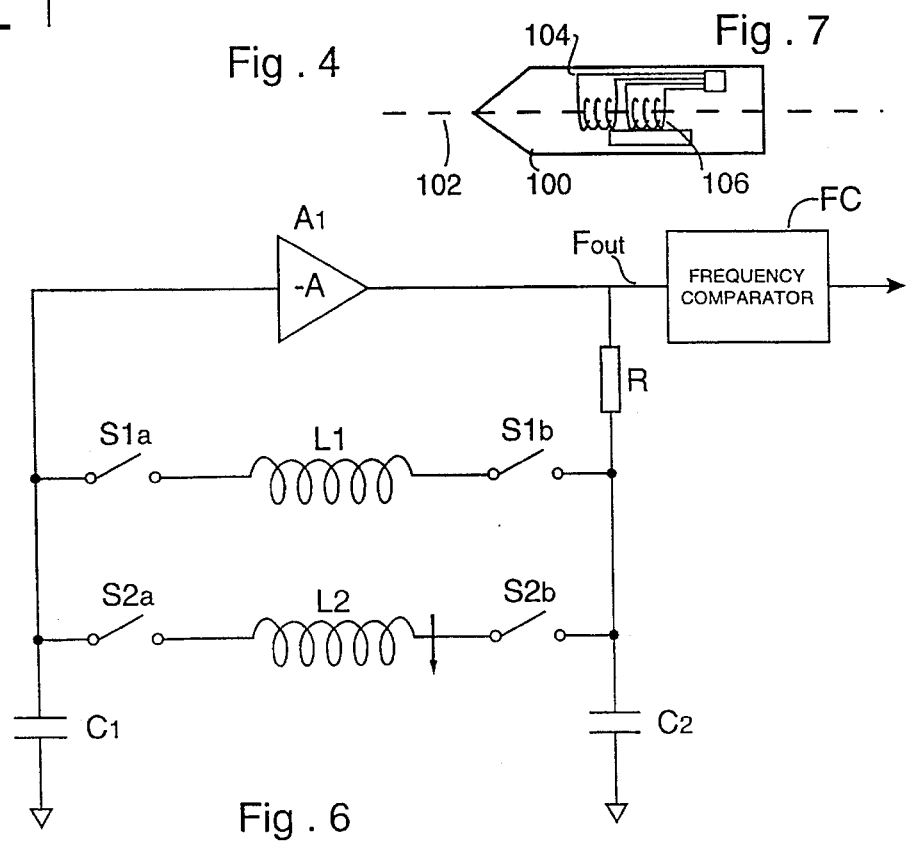

INCLINATION SENSOR USING SENSING COILS WOUND ON LINEAR VESSEL PARTIALLY FILLED WITH FLUID

BACKGROUND OF THE INVENTION

The present invention relates to an inclination angle sensor, to a method of sensing angles of inclination, and to a device (particularly an underground drilling or rock-piercing tool) employing an angle sensor.

WO88/06716 and JP-A-60/100712 disclose inclination angle sensors employing annular containers partly filled with a ferromagnetic or conductive fluid, e.g. mercury. The container is mounted in a vertical plane. Coils are wound about lower regions of the container, one on each side of the vertical diameter. The inductance of each coil is affected by the presence of the fluid within it. Thus when the container is tilted about its horizontal axis, the relative inductances of the coils vary. This is used to monitor the tilting.

Such devices are rather restricted in their application. Clearly, if tilting also occurred about an axis parallel to a horizontally extending diameter, e.g. so that the annulus became horizontal, the sensor would not work properly. Furthermore it is not very sensitive to small changes in inclination.

SUMMARY OF THE INVENTION

It is an object of a preferred embodiment of the invention to provide a system for sensing the angle of inclination of the longitudinal axis of an article which may be substantially independent of the angle of roll of the article about that axis. It is thus particularly relevant to inclination sensing of an object such as an underground soil or rock piercing or drilling tool, which may roll about the drilling axis. It is of great important that its angle of climb or dive can be sensed without the introduction of errors from roll.

Thus in one aspect the invention provides an angle sensor device comprising an elongate vessel partly filled with a fluent material having electrical conduction and/or ferromagnetic properties; and at least two sensing coils disposed so that their inductances are dependent on the content of respective longitudinally spaced regions of the vessel. Thus tilting the vessel will cause the fluent material to flow in the vessel and produce changes in the inductances of the coils. Preferably the coils are wound around the surface of the vessel at axially spaced regions. Preferably there are two like coils symmetrically disposed. The apparatus may include means for supplying an a.c. supply to the coils, and means for detecting the relative change in inductance of the coils with inclination angle.

Preferably the vessel containing the fluent material is non-conducting and non-magnetic, and of cylindrical shape.

In a second aspect the invention provides an angle sensing method in which a vessel of a device as described above is coupled to an article whose inclination angle is to be sensed, and relative changes in the coil inductances are monitored. If the fluent material has ferromagnetic properties, its presence within the region of a coil will increase its inductance. If, however, the fluent material is non-magnetic but electrically conducting, e.g mercury or an electrolyte, its presence within the region of a coil will reduce its inductance by eddy current reaction. In either case, the relative volumes of fluent material within an otherwise matched pair of coils will affect their relative inductances, which will then vary with inclination of the containing vessel. If the vessel is truly cylindrical, the relative inductances will not be affected by roll about its longitudinal axis, given truly matched cylindrical coils.

BRIEF DESCRIPTION OF THE DRAWINGS

Some embodiments of the invention will now be described by way of example with reference to the accompanying drawings in which:

FIG. 4 is a graph of output signals for the embodiments shown in FIGS. 2 and 4;

FIG. 6 shows an alternative method of sensing inductance based on frequency change in resonant circuits; and FIG. 7 is a schematic view of a mole including an inclination angle sensor.

DESCRIPTION OF THE PREFERRED EMBODIMENTS

Figure 1:
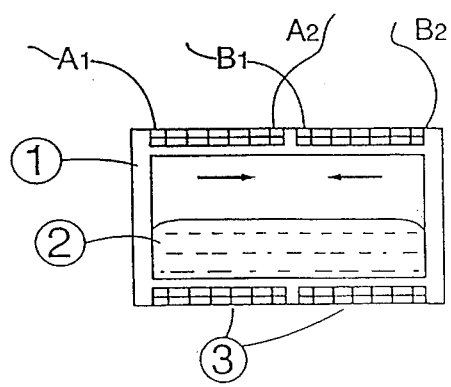
FIG. 1 is a schematic axial section through a sensor device embodying the invention.

FIG. 1 shows the principle of construction. A non-metallic tube 1 with closed ends is part-filled with ferromagnetic or conducting fluid 2. Around the tube are two identically wound coils 3, arranged so that if connected in series to an a.c. supply they are oppositely polarised. (A device whose coils are polarised in the same sense is also possible, but for this and subsequent illustrations the convention of opposed polarities has been adopted for convenience, the relative polarities being indicated by arrows. Because the excitation is a.c., the arrows in fact relate to the relative phase of current or flux at a particular instant).

When horizontal, the fluid content in each half is the same; when tilted on the longitudinal axis, more fluid will flow into the lower half. With ferromagnetic fluid, the lower coil will have increased inductance, while the inductance of the upper coil is reduced. With conducting fluid such as mercury, the inductance of the lower coil will fall, because eddy currents circulating in the fluid will produce flux opposing the excitation, while the inductance of the upper coil will rise with the absence of conducting fluid. In either case, the relative inductances of the coils will change with inclination angle, and this change may be measured by suitable means.

Figure 2:
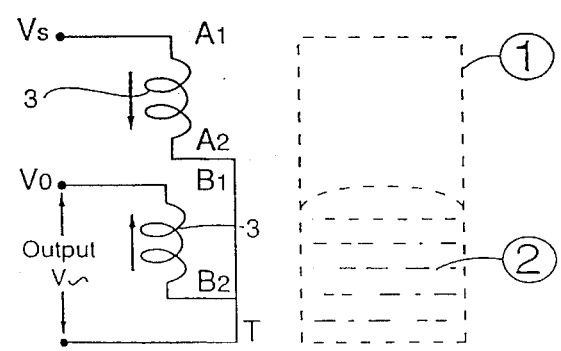
FIG. 2 shows a schematic circuit diagram.

One simple method of detecting the relative change in inductance is shown in FIG. 2. The two coils are connected in series across the a.c. supply Vs-Vo so as to produce opposed flux directions, the centre junction at terminals A2-B2 being brought out as a tap T. The circuit now behaves as a simple auto-transformer. The voltage at tap T relative to Vo will vary with the relative fluid content, FIG. 2 showing one extreme condition in which all the fluid is in the lower coil.

With both coils in series, the same current flows through both, so that the volt-drop across each coil will vary with their relative impedances. As their resistance is nominally constant, the only significant variable is inductance with fluid content, as already described. With a conducting fluid such as mercury, the condition indicated in FIG. 2 results in minimum voltage across terminals B1-B2, maximum across terminals A1-A2. With the vessel horizontal, equal fluid content in each will result in equal sharing of the voltage, so that the level at T will be half the supply. Further tilting to invert the vessel will result in the opposite extreme, the resulting characteristic output being as shown in the upper curve of FIG. 4, in which the raw a.c. level at T has been demodulated by conventional means to produce a d.c. voltage. The result is a small modulation of X% of the total supply.

If the fluid is ferromagnetic, it will be appreciated that a similar result will ensue but with reversed direction, i.e. the voltage across terminals B1-B2 in FIG. 2 will be maximum in this extreme condition, and the resulting curve in FIG. 4 will start high at the origin. Either type of fluid may therefore be used, with appropriate sensing of the direction of inclination.

Figure 3:
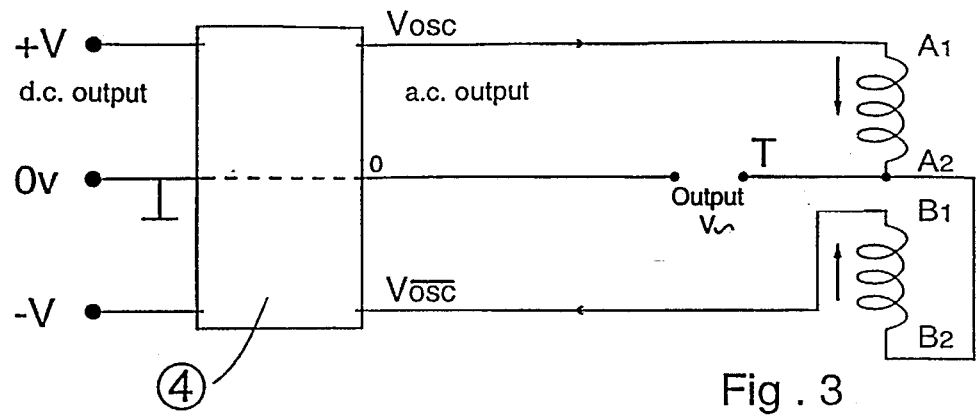
FIGS. 3 and 5 show more sophisticated variants of FIG. 2.
Figure 5:
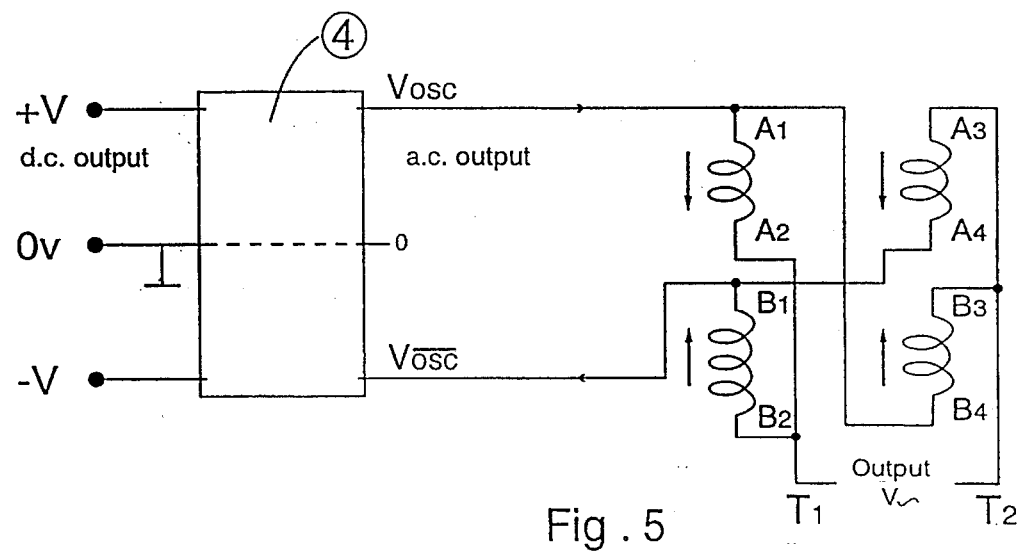

A method of using the same simple series connected coils to produce a signal of 100% modulation is shown in FIG. 3. Here the a.c. supply is derived from a push-pull oscillator fed from a centre-zero d.c. source with 0v ground. The a.c. outputs are Vosc and its invert $\overline{Vosc}$ relative to ground, i.e. of opposite phase sense to each other. The sensor tap T level is compared with the 0v ground, and will give a null output with horizontal equalisation of coil inductances. With tilt, there will be an increase in signal amplitude either in phase or in antiphase with the supply reference, and this output can be synchronously demodulated by well known methods to produce a d.c. voltage which changes in amplitude with the a.c. level, but also in polarity with the a.c. phase. It can be seen that with the FIG. 2 connections the change in voltage level resulting from amplitude modulation of the a.c. supply by inclination will be a small percentage of the total voltage in the electronic circuit used to process the signal, while the FIG. 2 connections produce an output signal which is 100% modulated about ground level.

Where maximum sensitivity to angular change is required, an alternative construction uses bifilar-wound pairs of identical coils of half the wire cross-section to fill the same space, connected to produce a differential output. FIG. 5 shows the circuit arrangement using the same oscillator as FIG. 3, although a single-ended a.c. supply Vs-Vo as FIG. 2 could also be used, because the differential output is isolated from supply. There are two pairs of series connected coils, each pair consisting of one coil from each of the bifilar-wound pairs. One such series-connected pair is represented by A1-A2-B2-B1, with centre tap T1 at A2-B2. The second coils from the bifilar-wound pairs are connected in series across the same supply, but with supply connections rearranged, A4-A3-B2-B4 having centre tap T2 at A3-B3, and supply $\overline{Vosc}$ being fed to coil B instead of coil A. The result is that when there is more mercury within coil B, tap T1 voltage is pulled in the direction of Vosc by the reduced inductance, while T2 voltage is similarly pulled towards $\overline{Vosc}$. The voltage between T1 and T2 now gives a differential output of greater magnitude than in the single-coil arrangement, because it represents the sum of the outputs of, in effect, two sensors. Again, the horizontal equalising of fluid content gives a null, while tilt gives an increasing amplitude signal of in-phase or antiphase polarity with reference to the supply frequency, but now floating with respect to the supply terminals.

A completely different but well-known technique for measuring inductance change is to connect the inductance in series with a capacitor to form an oscillator circuit, of which the output frequency will vary inversely with the square root of the inductance for a given capacitance value. By using the same capacitor for both, the relative inductances of two coils can be compared by switching them alternately into the same oscillator circuit. The resulting frequencies can then be used as a measure of relative inductances of the coils. This technique lends itself well to digital methods of signal processing, and is shown in principle in FIG. 6.

In this case, the two coils L1 and L2 are alternately connected via switch pairs S1a, S1b and S2a, S2b to two capacitors C1, C2, an inverting amplifier A1 and resistor R in an oscillator circuit. The frequency $F_{out}$ resulting from connection of either coil L1 or L2 will then be a function of particular coil inductance. The ratio of these frequencies is determined by a frequency comparator FC and will be the ratio of the square roots of their inductances, and this ratio therefore a function of inclination angle. The frequency ratio will be virtually independent of drift with temperature of coil resistance and capacitance values, because the same capacitors are used to resonate each coil, and coil resistance does not directly affect frequency.

The alternative switching of the coils may be accomplished using solid-state FET switches, integrated CMOS analogue switches, diodes or any other technique familiar to those skilled in electronic circuit design. The switch timing, frequency measuring and comparing, and resulting data processing are also capable of accomplishment using numerous alternative methods.

Whichever method or technique is used for inductance comparison, the basic sensor design embodying this invention can be of great simplicity, comprising a partly fluid-filled closed tube surrounded by two matched coils, the relative inductances of which are compared, e.g. using known signal processing techniques. It is extremely sensitive to tilt, and its characteristics can be tailored by mechanical design to meet the system needs. These are typically high sensitivity and linearity over a range of plus/minus 20° or so from horizontal, with reduced sensitivity and linearity over greater angles. With applications to horizontal boring tools, tilt measurement accuracy independent of roll is a vital requirement which is easily met by this invention.

FIG. 7 is a schematic view of a mole, i.e. a self-propelled underground drilling device. It has an elongate body 100 which tends to rotate as it operates. For control, it is important to know the inclination of its longitudinal axis 102. Thus it is furnished with a sensor 104 embodying the present invention, the axis of the vessel 106 being parallel (and preferably coincident) with the axis of the mole. Thus it can sense inclination of the mole, unaffected by rotation of the mole about its axis.

I claim:

1. An inclination angle sensor comprising: a linear elongate vessel; a fluent material which only partly fills the vessel, the fluent material being selected from the group consisting of electrically conductive fluent materials and ferromagnetic fluent materials; first and second coil means wound around the vessel at respective regions thereof so that the inductance of each coil means is affected by the contents of a respective different longitudinal region of said container; capacitor means; switch means for selectively coupling said capacitor means either to said first coil means to produce a first oscillator circuit or to said second coil means to produce a second oscillator circuit; and means for comparing the frequencies of said first and second oscillator circuits so as to derive data related to the inductances of said first and second coil means and thus indicative of the inclination of said vessel.

2. A drilling tool having a longitudinal axis of advancement about which rotation occurs in use and including an inclination angle sensor comprising: a linear elongate vessel; a fluent material which only partly fills the vessel, the fluent material being selected from the group consisting of electrically conductive fluent materials and ferromagnetic fluent materials; first and second coil means wound around the vessel at respective regions thereof so that the inductance of each coil means is affected by the contents of a respective different longitudinal region of said container; capacitor means; switch means for selectively coupling said capacitor means either to said first coil means to produce a first oscillator circuit or to said second coil means to produce a second oscillator circuit; and means for comparing the frequencies of said first and second oscillator circuits so as to derive data related to the inductances of said first and second coil means and thus indicative of the inclination of said vessel; said sensor being mounted with the longitudinal axis of the vessel parallel to the longitudinal axis of advancement.

3. A method of sensing the angle of inclination of an object, said method comprising: providing an inclination angle sensor comprising a linear elongate vessel, a fluent material which only partly fills the vessel, the fluent material being selected from the group consisting of electrically conductive fluent materials and ferromagnetic fluent materials, first and second coil means wound around the vessel at respective regions thereof so that the inductance of each coil means is affected by the contents of a respective different longitudinal region of said container, capacitor means, switch means for selectively coupling said capacitor means either to said first coil means to produce a first oscillator circuit or to said second coil means to produce a second oscillator circuit, and comparing means for comparing the frequencies of said first and second oscillator circuits thereby deriving data which are related to the inductances of said first and second coil means; and said method further comprising mounting said sensor on the device in a predetermined orientation and operating the sensor by effecting said comparison of frequencies to derive data related to the inclination of the axis of the vessel and hence to the inclination of the object.

* * * * *